US012317118B2

(12) United States Patent
Meredith et al.

(10) Patent No.: US 12,317,118 B2
(45) Date of Patent: *May 27, 2025

(54) ADAPTIVE THROUGHPUT FOR USER EQUIPMENT COMMUNICATING VIA A MANAGED WI-FI SERVICE NETWORK

(71) Applicants: AT&T Intellectual Property I, L.P., Atlanta, GA (US); AT&T Mobility II LLC, Atlanta, GA (US)

(72) Inventors: Sheldon Meredith, Roswell, GA (US); Zachary Meredith, Roswell, GA (US); Yevgeniy Puzyrev, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 177 days.

This patent is subject to a terminal disclaimer.

(21) Appl. No.: 18/157,433

(22) Filed: Jan. 20, 2023

(65) Prior Publication Data

US 2023/0164618 A1 May 25, 2023

Related U.S. Application Data

(63) Continuation of application No. 16/789,042, filed on Feb. 12, 2020, now Pat. No. 11,582,632.

(51) Int. Cl.
*H04W 28/02* (2009.01)
*H04W 36/14* (2009.01)
(Continued)

(52) U.S. Cl.
CPC ... *H04W 28/0247* (2013.01); *H04W 28/0226* (2013.01); *H04W 48/16* (2013.01); *H04W 36/1446* (2023.05); *H04W 84/12* (2013.01)

(58) Field of Classification Search
CPC ......... H04W 28/0247; H04W 28/0226; H04W 48/16; H04W 36/1446; H04W 84/12;
(Continued)

(56) References Cited

U.S. PATENT DOCUMENTS

| 8,902,753 | B2* | 12/2014 | Strasman | .............. | H04W 24/08 |
| | | | | | 370/230.1 |
| 2017/0328725 | A1* | 11/2017 | Schlesinger | ....... | G01C 21/3438 |
| 2018/0351809 | A1* | 12/2018 | Meredith | ................ | H04W 4/24 |

* cited by examiner

*Primary Examiner* — Nizam U Ahmed
(74) *Attorney, Agent, or Firm* — Guntin & Gust, PLC; Atanu Das

(57) ABSTRACT

A managed Wi-Fi service network device can receive, from a cellular network device, an allowable throughput rate at which a user equipment is authorized to communicate via a managed Wi-Fi service network. Based on the allowable throughput rate, the managed Wi-Fi service network device can monitor a communication rate of the user equipment via the managed Wi-Fi service network. In response to the user equipment communicating via the managed Wi-Fi service network at a rate that exceeds the allowable throughput rate, the managed Wi-Fi service network device can facilitate reducing the communication rate of the user equipment. Also, a user equipment can receive from a cellular network device an allowable throughput rate at which the user equipment is authorized to communicate via the managed Wi-Fi service network. The UE can communicate via the managed Wi-Fi service network at a communication rate that does not exceed the allowable throughput rate.

20 Claims, 10 Drawing Sheets

(51) Int. Cl.
*H04W 48/16* (2009.01)
*H04W 84/12* (2009.01)

(58) Field of Classification Search
CPC ......... H04W 28/0865; H04W 28/0925; H04W 28/0983; H04W 48/14; H04W 88/06; H04L 47/781
See application file for complete search history.

ADAPTIVE THROUGHPUT FOR USER EQUIPMENT COMMUNICATING VIA A MANAGED WI-FI SERVICE NETWORK

RELATED APPLICATION

The subject patent application is a continuation of, and claims priority to, U.S. patent application Ser. No. 16/789,042, filed Feb. 12, 2020, and entitled "ADAPTIVE THROUGHPUT FOR USER EQUIPMENT COMMUNICATING VIA A MANAGED WI-FI SERVICE NETWORK," the entirety of which priority application is hereby incorporated by reference herein.

TECHNICAL FIELD

The present application relates generally to telecommunications, and, more specifically, to bandwidth management for user equipment communicating via a managed wireless fidelity (Wi-Fi) service network.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). The amount of traffic in cellular networks has experienced a tremendous amount of growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (IOT)). Additional technological growth includes 4K video, augmented reality, cloud computing, industrial automation, and vehicle to vehicle (V2V).

Consequently, advancement in future networks are driven by the demand to provide and account for massive connectivity and volume, expanded throughput and capacity, and ultra-low latency.

Fifth generation (5G) mobile access networks, which can also be referred to as New Radio (NR) access networks, are currently being developed and expected to handle a very wide range of use cases and requirements, including among others enhanced mobile broadband (eMBB) and machine type communications (e.g., involving IOT devices). 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G provides better speeds and coverage, targeting much higher throughput with low latency and utilizing higher carrier frequencies (e.g., higher than 6 gigahertz (GHz)) and wider bandwidths. A 5G network also increases network expandability up to hundreds of thousands of connections.

In cellular networks, radio interference can have a direct impact on coverage, link quality, and data throughput. Within a given bandwidth, capacity can be met by adding network node devices (e.g., network nodes comprising cellular towers), but this can increase radio interference in the same area. Not only can there be a practical limit to the density of base stations due to handoff speeds, but the cost of adding network nodes, along with ongoing operation costs related to those network nodes, can be high.

The increase in the number of devices and the desire to meet capacity, has led to the practice of "offloading" cellular traffic (e.g., often referred to as "cellular data" traffic) onto wireless fidelity (e.g., Wi-Fi) networks, which are typically provided by Wi-Fi routers that are connected via the Internet, for example, through a broadband network (e.g., DSL, ADSL, DOCSIS, etc.) as a way of reducing direct wireless cellular network demand (e.g., enabling mobile devices to switch to a Wi-Fi network for transmissions when a Wi-Fi network is available). For example, a mobile phone might use its cellular data connection, but then when the mobile phone is nearby a Wi-Fi router that offers an "open" Wi-Fi network, the mobile phone can switch to using the Wi-Fi network. Such open networks, which can often be found in airport terminals, coffee shops, fast food restaurants, etc., might not require a password, or in other instances, may require a user identity associated with the mobile phone to agree to certain terms prior to allowing connection to the Wi-Fi network. Today, cellular carriers contract with managed Wi-Fi service network providers such as those provided by, for example, Boingo, HP/Aruba, Global Crossing, and Mobilite, to offload mobile data service through these Wi-Fi service networks. AT&T, for example, is currently partnering with managed Wi-Fi service network providers at over two dozen airports, multiple military bases, major casinos, and on municipal Wi-Fi. A cellular carrier typically pays per gigabyte for the data transmissions by its subscriber mobile devices when the mobile devices use these Wi-Fi networks. AT&T's annual expenses paid to managed Wi-Fi service network providers for allowing its user equipment (UEs) to connect and use these managed Wi-Fi service networks can be in the tens of millions of dollars per year. These expenses are likely to grow dramatically over the next five years.

The above-described background relating to cellular networks and Wi-Fi networks, and is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
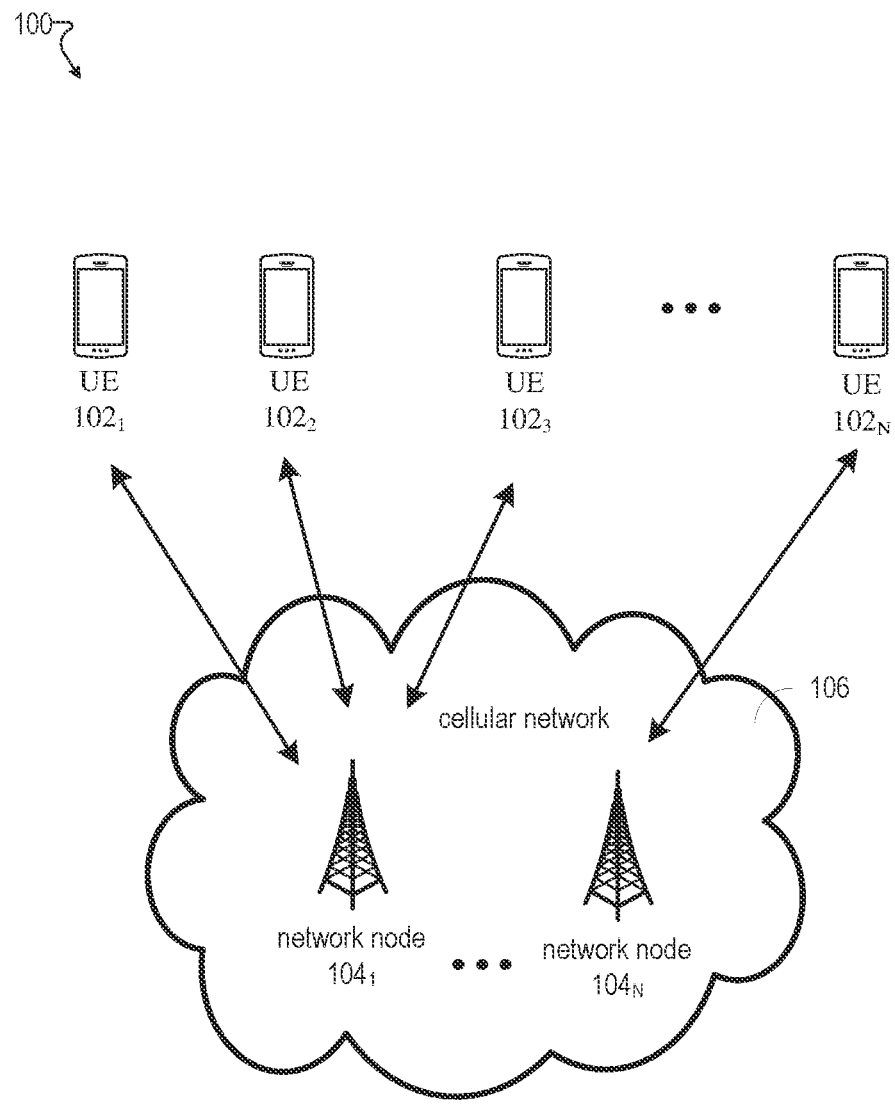
FIG. 1 illustrates an example wireless communication system in which a network node device (e.g., network node) communicates with user equipment (UEs), in accordance with various aspects and example embodiments of the present application.

The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide an understanding of the subject disclosure. It may be evident, however, that the subject disclosure may be practiced without these specific details. In other instances, well-known structures and devices are shown in block diagram form to facilitate describing the subject disclosure. For example, the methods (e.g., processes and logic flows) described in this specification can be performed by devices (e.g., a user equipment (UE), a network node device, a bandwidth manager device, etc.) comprising programmable processors that execute machine executable instructions to facilitate performance of the operations described herein. Examples of such devices can be devices comprising circuitry and components as described in FIG. 9 and FIG. 10.

The present patent application relates to managing bandwidth when allowing UEs (e.g., mobile devices, mobile phones, cellular phones, smart phones, etc.) associated with a cellular carrier entity to connect to a managed Wi-Fi service network. AT&T, for example, currently uses the VERTEX platform to accept or reject connections of UEs registered to AT&T's cellular network to these managed Wi-Fi service networks as a function of AT&T's network load at the time of the UE's connection request to access a managed Wi-Fi service network. The result is that AT&T, and other cellular carriers, typically offload to a Wi-Fi network during peak busy times on its cellular network. Offloading to a Wi-Fi network during these peak cellular congestion times can save cellular carriers money, because the per-megabit costs of transmissions of cellular data during these peak times will be more expensive to a carrier. For example, offloading onto a Wi-Fi network can save AT&T roughly two thirds of the cost that would otherwise be incurred if AT&T did not offload. During peak hours, a cellular carrier might "throttle" data so that UEs transmit data at a lower throughput rate—for example, to a maximum of 1.5 megabit per second (Mbps). But, when a UE connects with a managed Wi-Fi services network, the UE may transmit at substantially higher data rates. Since the cellular carrier pays by the gigabyte, this can actually result in unbalanced financial expenses, which can hurt the business case of offloading. For example, comparing expense per gigabytes saved on the cellular carrier's network (e.g., bandwidth cost associated with using the cellular network) versus expense per gigabytes used on the managed Wi-Fi service network (e.g., bandwidth cost associated with using the managed Wi-Fi service network), if the carrier saves one dollar of expense for one gigabyte on the cellular side, and then pays the managed Wi-Fi service network provider for one dollar for one gigabyte, that is a break-even resulting in no monetary loss to the cellular carrier. However, if the cellular carrier saves one dollar by offloading, but then must pay four more dollars as a result of the UE transmitting at a higher rate (resulting in more gigabytes transmitted), that results in a net monetary loss.

The present application discloses example embodiments that facilitate accomplishing the setting of a maximum allowable throughput (or maximum allowable data rate) for a UE communicating via a Wi-Fi network provided by a managed Wi-Fi service network provider.

According to some example embodiments, a managed Wi-Fi service network device (e.g., bandwidth manager device) can obtain a maximum allowable data rate for UEs transmitting on the managed Wi-Fi service network. In example embodiments, a managed Wi-Fi service network device can be operable to query a network device of the UE's registered cellular network to obtain a maximum allowable data rate. The maximum allowable data rate may be consistent for all UEs belonging to the cellular carrier's network, or the rate may be device-dependent to account for subscription parameters (e.g., throughput set as part of a subscriber-level agreement to maintain a minimum specific data throughput rate). In other example embodiments, a network device of the UE's registered cellular network is operable to transmit maximum allowable data rate information for the UEs of the cellular network within range of the managed Wi-Fi service network. When a UE connects to the managed Wi-Fi service network, the UE's identification information can be matched with the maximum data rate corresponding to the UE that was transmitted by the network device of the UE's cellular network, and the maximum data rate for the UE can be monitored for, and enforced, by, for example, the bandwidth manager device.

According to other example embodiments, a software application (e.g., software program, software module) can enable the operability of a UE to set a maximum data rate for the UE when it is connected with and communicating via a managed Wi-Fi service network.

FIG. 1 illustrates an example mobile communication system 100 (e.g., cellular communication system) in accordance with various aspects and embodiments of the subject disclosure. In example embodiments (also referred to as non-limiting embodiments), one or more user equipment (UE) $102_{1-N}$, whereby "N" represents some number, and wherein UE 102 generally refers to one of UEs $102_{1-N}$. UEs $102_{1-N}$ can communicate with one another via one or more network nodes $104_{1-N}$, whereby "N" represents some number, and wherein network node 104 generally refers to one of network nodes $104_{1-N}$. The network nodes $104_{1-N}$ can operate as part of a cellular network 106 (also known as mobile network).

UE $102_{1-N}$ can comprise, for example, any type of device that can communicate with cellular network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile phone, cellular phone, mobile terminal, smart phone, laptop mounted equipment (LME), universal serial bus (USB) dongles enabled for mobile communications, a computer having mobile capabilities, a mobile device, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. In example embodiments in accordance with the present application, UEs $102_{1-N}$ can have software and electronic components (e.g., circuitry, chips, etc.) that enable it to communicate wireless via a cellular network (e.g., cellular network 106), and also software and electronic components that enable it to communicate wirelessly via a Wi-Fi network.

Mobile communication system 100 can be or can include a large-scale wireless communication network that spans various geographic areas, and can comprise various additional devices and components (e.g., additional network devices, additional UEs, network server devices, etc.). Cellular network 106 can include various types of disparate networks, including but not limited to: cellular networks, femtocell networks, picocell networks, microcell networks, internet protocol (IP) networks, etc. Cellular network 106 can be operated by a cellular carrier entity, also known as a mobile network operator (MNO).

Still referring to FIG. 1, cellular network 106 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers. For example, mobile communication system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), and the like.

Still referring to FIG. 1, in example embodiments, UE 102 can be communicatively coupled (or in other words, connected) to a network node 104 of the cellular network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB device.

Still referring to FIG. 1, in various embodiments, cellular network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 gigabits per second (Gbps)), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz, is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Given the increasing number of UEs using cellular networks, at peak usage times, the cellular network 106 is operable to limit data throughput rates (e.g., limit the maximum data rate to 1.5 Mbps). Typically, a multi-service proxy, which comprises a packet data conduit inside the cellular network 106 can reduce the throughput rates. The maximum data rate may depend on the type of device that is used, for example, or it may depend on a maximum data rate set for the subscriber identity based on a subscriber level agreement (e.g., an agreement that the subscriber's data rate shall not fall below 1.5 Mbps).

Figure 2:
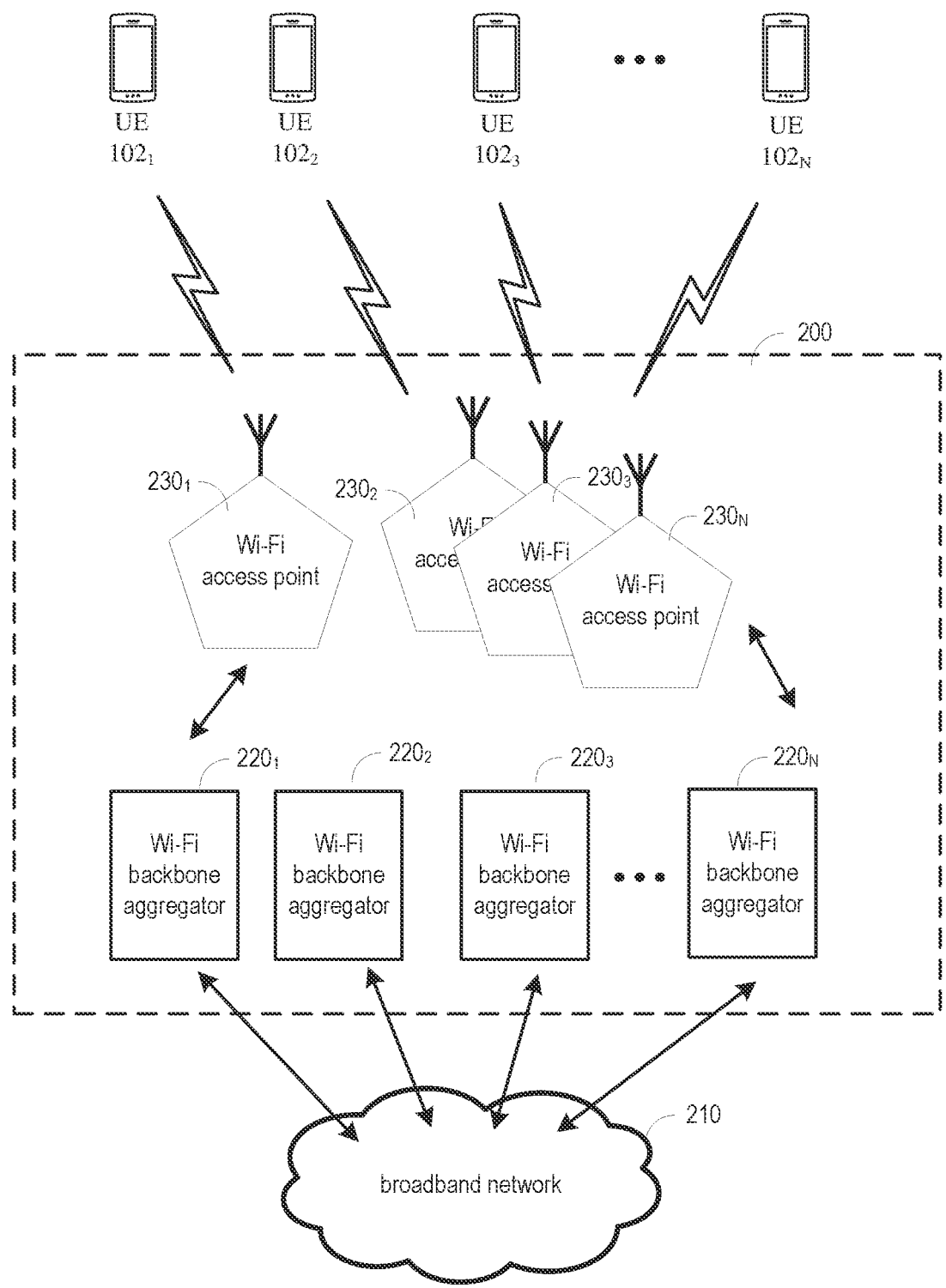
FIG. 2 illustrates an example of a managed Wi-Fi service network operable to communicate with UEs, in accordance with various aspects and example embodiments of the present application.

FIG. 2 illustrates an example of a managed Wi-Fi service network 200 that can communicate via a broadband network 210. The broadband network 210, for purposes of this application, can be distinct from a cellular network (e.g., cellular network 106). The broadband network 210 can be accessed by user equipment (e.g., UE $102_{1-N}$) via one or more Wi-Fi connections.

The Wi-Fi backbone aggregators $220_{1-N}$ (whereby "N" represents some number, and wherein Wi-Fi backbone aggregator 220 generally refers to one of Wi-Fi backbone aggregators $220_{1-N}$) provide access to the broadband network 210. The broadband network 210 can be operable to use internet protocol (IP) to deliver video, voice (e.g., voice over IP (VoIP), and data packets.

In example embodiments, the broadband network 210 can comprise, for example, a fixed packet network. The fixed packet network can comprise, for example, a cable television (CATV) network implementing the data over cable service interface specification (DOCSIS) and PacketCable standards. The fixed packet network can comprise headend equipment such as a cable modem termination system (CMTS) device that transmits and receives communications from one or more devices of the managed Wi-Fi service network 200 (e.g., from one or more Wi-Fi backbone aggregators $220_{1-N}$) through one or more hybrid fiber coaxial cable (HFC) networks. The fixed packet network can also comprise networks using asynchronous transfer mode (ATM), digital subscriber line (DSL), or asymmetric digital subscriber line (ADSL) technology. These networks have traditionally been provided by telephone companies (telcos). ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from Wi-Fi backbone aggregators 220 onto a high-capacity uplink (ATM or Gigabit Ethernet backhaul) to internet service providers (ISPs). Transmission media connecting the central office and Wi-Fi backbone aggregators 220 can comprise both twisted pair cables and fiber optic cables.

Referring to FIG. 2, the broadband network 210 can also comprise one or more satellite networks, which can enable the exchange of voice, data, and video. In addition to television programming services, satellite networks, such as a DBS (Direct Broadcast Satellite) system, operated by DBS broadcast satellite providers (e.g., Dish Networks, DIRECTV, HughesNet), can be operable to enable high speed internet and voice services. A typical satellite broadband network can comprise a network operations center that interfaces with the Internet and transmits signals via satellite to a customer identity's premises. At the customer identity's premises, a satellite antenna (which can be mounted on a building associated with the customer identity, for example) can be operable to transmit and receive signals. In example embodiments in accordance with the present application, depending on the type of broadband network 210, the Wi-Fi backbone aggregator can comprise, a cable modem (CMs) for modulating and demodulating signals to and from a cable network (e.g., in accordance with DOCSIS). The Wi-Fi backbone aggregator 220 can comprise a DSL modem, DSL telephony modem, or DSL gateway device, operable to communicate with a DSLAM. With a satellite broadband network, the one or more Wi-Fi backbone aggregators $220_{1-N}$ can comprise satellite modems (also referred to as satmodems).

Referring to FIG. 2, Wi-Fi backbone aggregators $220_{1-N}$ can aggregate transmissions received from one or more UEs (e.g., UEs $102_{1-N}$) via one or more Wi-Fi access point devices (e.g., Wi-Fi access points $230_{1-N}$, whereby "N" represents some number, and wherein Wi-Fi access point 230 generally refers to one of Wi-Fi access points $230_{1-N}$. A Wi-Fi access point device can comprise a wireless router that operates in accordance with the IEEE 802.11 family of standards, and can serve as an access point to the broadband network 210 for one or more UEs that have a wireless adapter (e.g., a Wi-Fi adapter) for transmitting and receiving signals between the Wi-Fi access point 230. The Wi-Fi backbone aggregator device (e.g., Wi-Fi backbone aggregator $220_2$) can have embedded in it Wi-Fi routing functionality that operates in accordance with, for example, the IEEE 802.11 family of standards, enabling such a Wi-Fi backbone aggregator to receive transmissions via a Wi-Fi connection directly from a UE.

Figure 3:
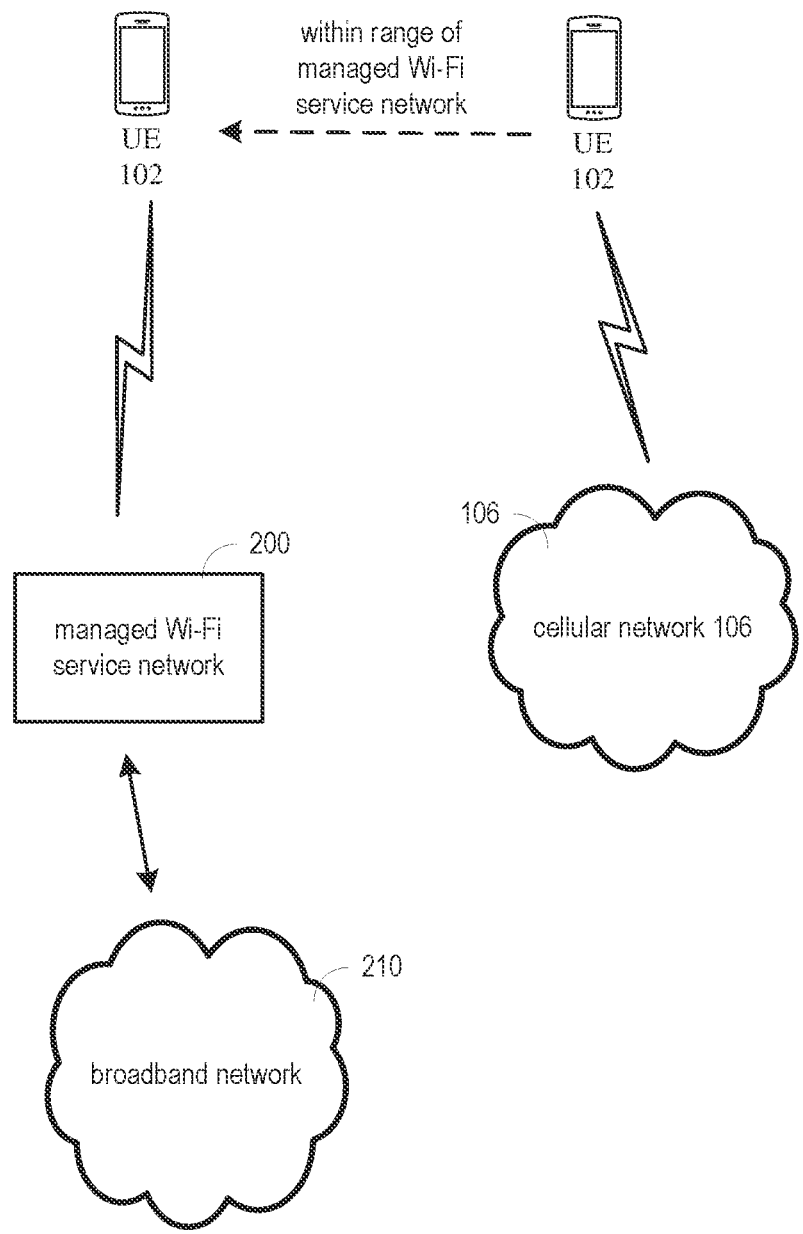
FIG. 3 illustrates an example of offloading of bandwidth usage from a cellular network onto a managed Wi-Fi service network, in accordance with various aspects and example embodiments of the present application.

Now referring to FIG. 3, as mentioned above, 5G wireless communication networks are expected to fulfill the demand of exponentially increasing data traffic to accommodate the proliferation of UEs. In cellular networks, radio interference can have a direct impact on coverage, link quality, and data throughput. Within a given bandwidth, capacity can be met by adding network node devices (e.g., network node $104_{1\text{-}N}$), but this can increase radio interference in the same area. Not only can there be a practical limit to the density of base stations due to handoff speeds, but the cost of adding network nodes, along with ongoing operation costs related to those network nodes, can be high. For these reasons, wireless carriers have been "offloading" mobile traffic (e.g., often referred to as "cellular data" traffic) onto broadband networks (e.g., broadband network 210) via Wi-Fi as a way of reducing direct cellular network demand (e.g., enabling UEs to switch to a Wi-Fi network for transmissions when a Wi-Fi network is available). AT&T, for example, currently uses its own VERTEX platform to accept or reject connections of its UEs to these managed Wi-Fi service networks as a function of AT&T's own network load at the time of the connection request.

In FIG. 3, a UE (e.g., UE $102_3$) belonging to a subscriber identity can be transmitting and receiving mobile traffic via a cellular network (e.g., cellular network 106). As an example, the subscriber identity can be watching a movie on the UE, and as such, the UE can be receiving, from the cellular network, data packets comprising video. As indicated by the dotted line with arrow, when the UE enters the wireless transmission/reception range of a WLAN which can be a Wi-Fi network established by a Wi-Fi backbone aggregator having Wi-Fi routing functionality (e.g., Wi-Fi backbone aggregator $220_2$), the UE can connect (e.g., if accepted as a function of AT&T's network load at the time of the connection request) to a managed Wi-Fi service network (e.g., managed Wi-Fi service network 200). Once connected and authenticated, the UE can begin to receive data via the managed Wi-Fi service network. As such, when a UE (e.g., one of UEs $102_{1\text{-}N}$) transitions from a state in which it is communicating through the cellular network (e.g., cellular network 106) to a state in which it is communicating through the managed Wi-Fi service network, it stops using bandwidth associated with the cellular network for data transmissions, and begins to use bandwidth provided through the managed Wi-Fi services network.

Figure 4:
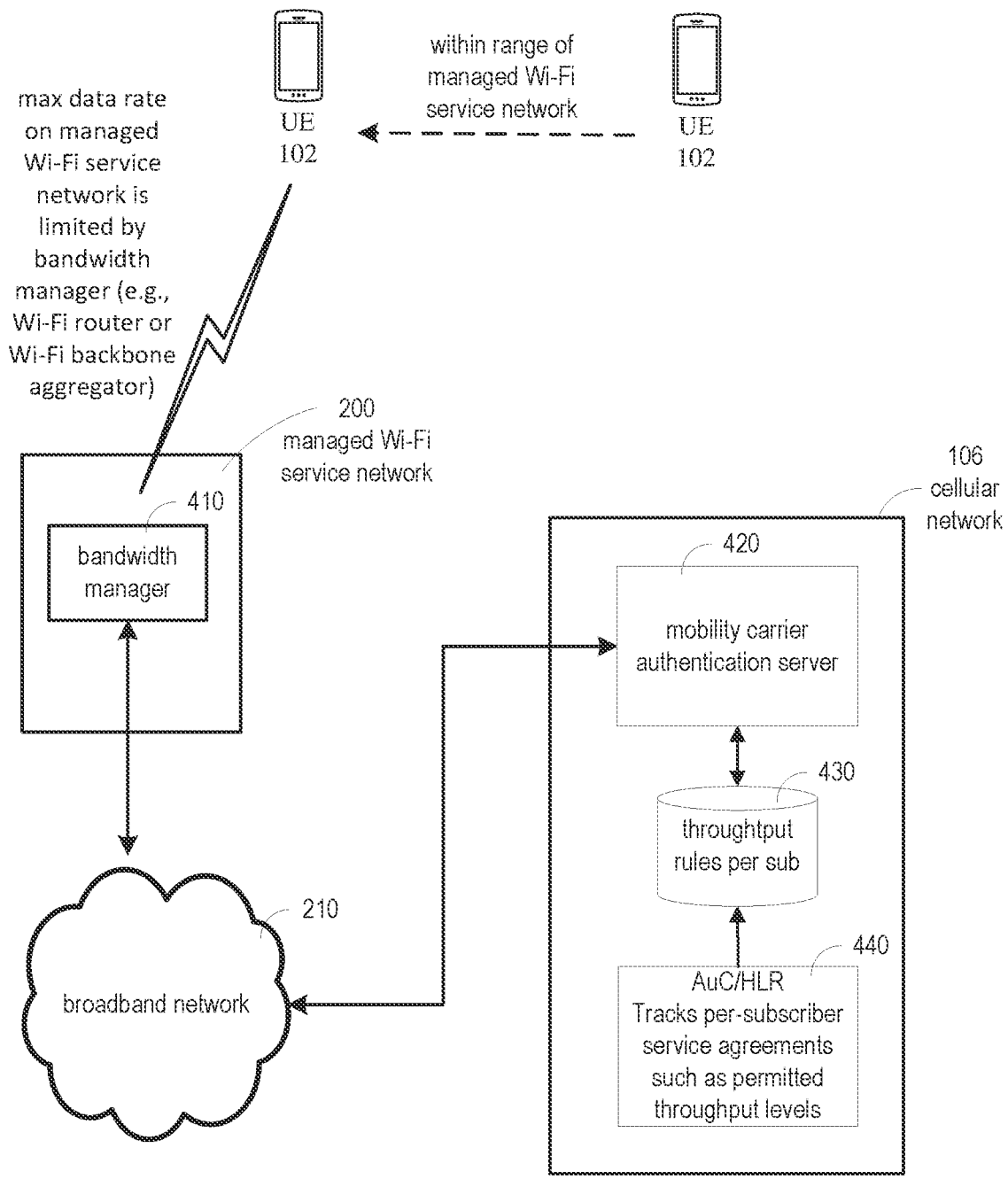
FIG. 4 illustrates an example of bandwidth management that can be performed by a bandwidth manager to limit the data rate at which a UE communicates via a managed Wi-Fi service network, in accordance with various aspects and example embodiments of the present application.

Moving to FIG. 4, in accordance with example embodiments of the present application, systems and methods are provided to monitor UEs of subscriber identities connected to a managed Wi-Fi service network and limit the maximum data rate for the UE when it is connected with and communicating via a managed Wi-Fi service network.

In accordance with example embodiments of the present application, a managed Wi-Fi service network device, e.g., bandwidth manager device (bandwidth manager 410), can obtain a maximum allowable data rate for UEs transmitting on the managed Wi-Fi service network (e.g., managed Wi-Fi service network 200), and facilitate accomplishing the task of setting maximum allowable data rate on managed Wi-Fi service networks such as those made available via PassPoint or WiFi 2.0 authentication protocols. In example embodiments, when a UE (e.g., UE 102) attempts to connect to managed Wi-Fi service network 200, the bandwidth manager 410, which can comprise a Wi-Fi access point (e.g., Wi-Fi access point 230), and can also comprise a Wi-Fi backbone aggregator (e.g., Wi-Fi backbone aggregator $220_{1\text{-}N}$), can be operable to query a network device of a UE's registered cellular network to obtain a maximum allowable data rate.

In example embodiments in accordance with the present application, the querying can comprise sending (e.g., transmitting), by the bandwidth manager 410, a request to the home cellular network (e.g., cellular network 106) of the UE 102 to request the maximum allowable data rate for transmission for the UE 102. The request can be sent to, for example, a mobility carrier authentication server device (e.g., mobility carrier authentication server 420) within the cellular network 106. This can be done contemporaneously with the connection authentication request (e.g., request from the bandwidth manager device to authenticate that the UE seeking to connect to the managed Wi-Fi service network is a registered UE of the cellular network provider that the managed Wi-Fi service network provider is contracted to allow connection. This authentication request is typically performed using a RADIUS request. The home cellular network device (e.g., the mobility carrier authentication server 420), can then access a data repository device (data repository 430), which can house a local database containing the maximum allowable data rate for a UE 102 associated with the subscriber when the UE 102 is using the managed Wi-Fi service network 200. The database can be associated with, for example, a user data registry (UDR), a home location register (HLR), an Authentication Centre (AuC), home subscriber server (HSS), etc., to discover the maximum allowable data rate for that UE. The maximum allowable data rate may be a function of time of day or geography. The maximum allowable data rate can be consistent for all UEs belonging to the cellular carrier's network, or the rate can be device-dependent to account for subscription parameters derived from an agreement between the cellular carrier entity and the subscriber identity associated with the UE 102, wherein the throughput is set as part of a subscriber-level agreement to maintain a minimum specific data throughput rate. As an example, cellular carriers may have different tiers (or levels) of bandwidth for which their subscribers pay. A subscriber identity might subscribe to a plan in which the bandwidth might be, for example, 6 megabits per second (Mbps) downstream (e.g., from the fixed packet network to the Wi-Fi backbone aggregator) and 1 Mbps on the upstream (e.g., from the Wi-Fi backbone aggregator to the fixed packet network). The information, then held by the mobile device, can also set a different maximum allowable data rate for each managed Wi-Fi service provider. These may be different to reflect different contractual costs per gigabyte for data transfers. The maximum allowable data rate can account for the expense per gigabyte of operating on the cellular carrier's network (e.g., bandwidth cost associated with using the cellular network) versus the expense per gigabyte of using the managed Wi-Fi service network(s) (e.g., bandwidth cost associated with using the managed Wi-Fi service network).

Still referring to FIG. 4, the maximum allowed data rate can be transmitted (e.g., by the mobility carrier authentication server 420), to the bandwidth manager 410. Based on the obtained maximum allowed data rate, the bandwidth manager 410 can control the data rate at its Wi-Fi access points for the UE 102 by monitoring all transactions to and from the UE 102 (e.g., using the MAC address of the UE 102 to identify it). If the bytes/second exceeds the maximum allowable data rate over a measured time interval, the bandwidth manager 410 can delay data packet transmission to slow down the overall transfer rate for the UE 102. This method allows each UE from each home cellular network to be treated independently in terms of maximum allowable data rate. Since maximum allowable data rate can change in the HLR, or Auc, the managed Wi-Fi service can re-query the UE's home cellular network periodically to better ensure the setting is fresh. The transferring of such maximum allowable data rates may also be accomplished by having the UE's home network (e.g., mobility carrier authentication server) proactively send a revised maximum data rate to the bandwidth manager 410 of the managed Wi-Fi service network 200 to which the UE is connected. Although not compliant with the current transmission standards over RADIUS, this would ensure the most current data rate setting is used. This method would reduce any update delays otherwise associated with the "check-in" interval. To the extent a data rate maximum per UE is not dynamically changing, such characteristic can be shared at the time of the initial connection to avoid re-queries.

Still referring to FIG. 4, in other example embodiments, a network device (e.g., mobility carrier authentication server 420) of the UE's registered cellular network is operable to transmit maximum allowable data rate information for the UEs of the cellular network within range of the managed Wi-Fi service network. The transmission can be made via an "out of band" file transfer, and as such, the maximum allowed data rate would not be requested or shared per UE connection over RADIUS. When a UE connects to the managed Wi-Fi service network, the UE's identification information can be matched with the maximum data rate corresponding to the UE that was transmitted by the network device of the UE's cellular network, and the maximum data rate for the UE can be monitored for, and enforced, by, for example, the bandwidth manager 410. When the UE 102 attempts to connect to the managed Wi-Fi service network 200, an authentication request is still sent to the mobile's home network (e.g., to the mobility carrier authentication server 420) via a RADIUS request, but once authenticated, the previously transmitted file is used to look up the maximum allowable data rate for the connecting device. Thereafter, control of the maximum data rate is performed using the previously described method using injected data packet delays.

Figure 5:
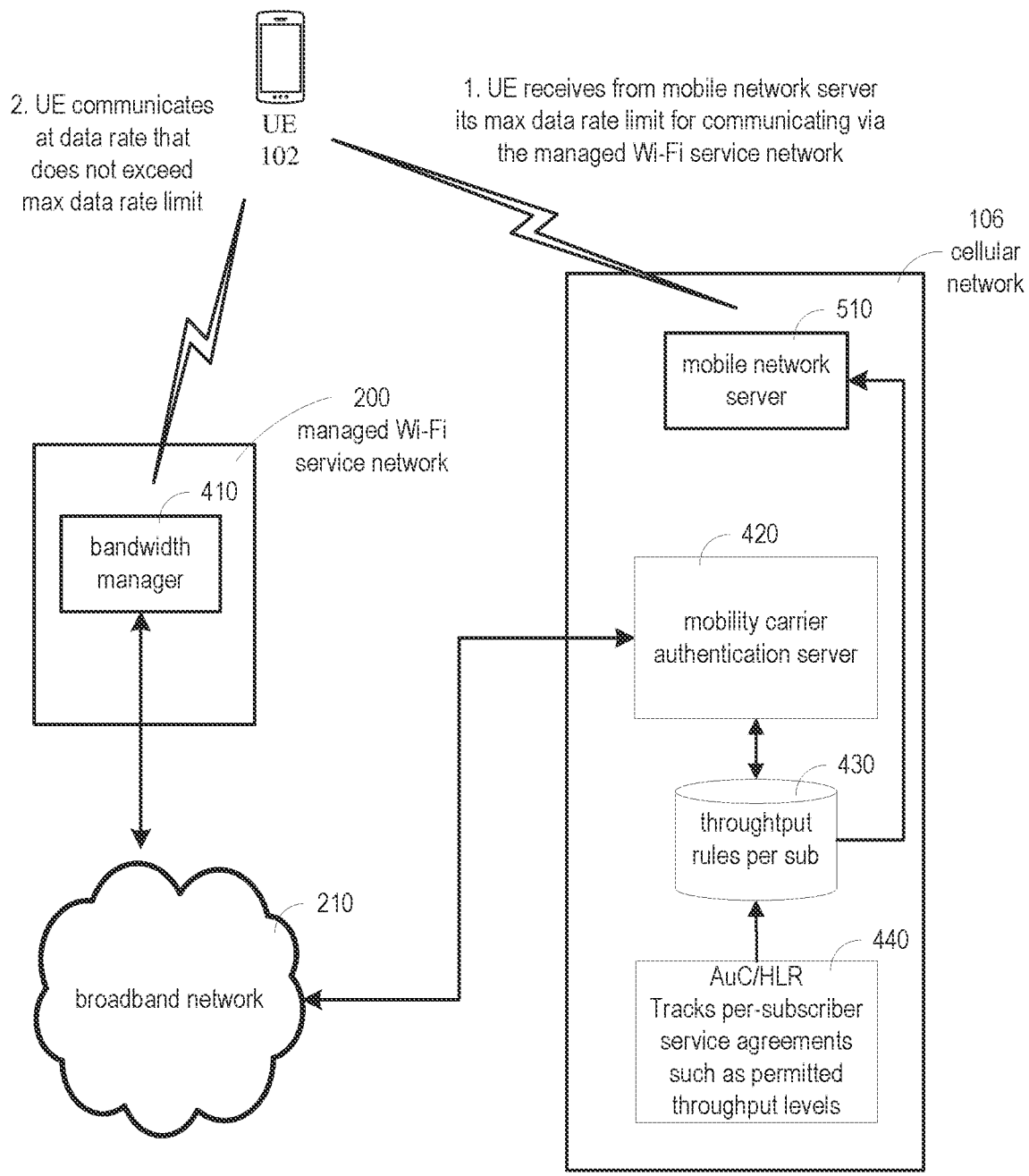
FIG. 5 illustrates an example of bandwidth management that can be performed by a UE to limit the data rate at which the UE communicates via a managed Wi-Fi service network, in accordance with various aspects and example embodiments of the present application.

Referring now to FIG. 5, in other example embodiments in accordance with the present application, a UE (e.g., UE 102) enabled with software can be operable to control its data rate so that it does not exceed its maximum allowable data rate when it is connected to a managed Wi-Fi service network (e.g., managed Wi-Fi service network 200). In example embodiments, the software can be pre-loaded onto the UE. Or, the UE can download the software. The UE 102 can dynamically (e.g., periodically) request its maximum allowed data rate from its home cellular network service. A dynamic request better ensures the UE can learn what its maximum allowable data rate is when such rate may be changing as a function of time or geography. In example embodiments, a request can be sent to a mobility carrier authentication server 420. In other example embodiments, a request can be sent to a mobile network server 510, as shown in FIG. 5. In response to receiving the request, the mobility carrier authentication server 420, or the mobile network server 510, can retrieve (e.g., retrieve from data repository 430) the maximum allowable data rate corresponding to the UE (after the UE has been identified and authenticated), and this information returned can comprise a different maximum allowable data rate for each managed Wi-Fi service network provider. These may be different to reflect different contractual costs per gigabyte for data transfers. Whether the maximum allowable data rate is preloaded, or sent to the UE 102 in response to a query at the time of connection to the managed Wi-Fi Service, the home cellular network of the UE 102 can contain a database (e.g., data repository 430) providing the maximum allowable data rate per mobile device, and the maximum allowable rate can also be a function of managed Wi-Fi service network provider, time, and geography. Also, the subscriber level agreement associated with the UE 102 can also affect the maximum allowable data rate. With these example embodiments, the UE (e.g., UE 102) can obtain its maximum allowable data rate for the individual access point, access point group, or for the managed Wi-Fi service network.

Still referring to FIG. 5, at the time of making a connection request, by the UE 102, via a Wi-Fi access point device (e.g., Wi-Fi access point 230), various methods can be used to discover the Wi-Fi identity. The service set identifier (SSID) transmitted from an access point can explicitly identify the Wi-Fi access point, its access point group, or the managed Wi-Fi service network provider. However, such a method has inherent risks from a fraudulent SSID. As such, in some other example embodiments, another approach is for the UE to use the MAC address of the Wi-Fi access point and to be informed of this information from its own home cellular network, and where such home network gets the same information from a managed Wi-Fi service network provider pursuant to a contractual relationship. Further, rather than providing the UE with an exhaustive list of Wi-Fi access points for one or more managed Wi-Fi service providers, the current location of the mobile device can be used to filter the superset of the Wi-Fi access points down to a smaller, local set. Doing so uses less memory and storage on the UE. Such mobile location can be garnered from a variety of locating methods, including global positioning system (GPS), cell-based locating, location by proxy-Wi-Fi location, observed time difference of arrival (OTDOA) methods, or others. Once a maximum allowable data rate is obtained by the UE 102 for a Wi-Fi connection, the UE 102 can monitor the volume of data transmission per unit time, and inject data packet delays into the packet scheduler on the UE 102 to throttle the packet data rate so as not to exceed the prescribed maximum allowable data rate.

In accordance with some example embodiments, one or more of the example methods and operations, as described above, can be performed as described in FIGS. 6-8. In each of the example operations described below, a UE had been communicating with a cellular network, but is now connecting with a managed Wi-Fi service network to offload its data communications through the managed Wi-Fi service network instead of via the cellular network. The methods and operations can be performed by one or more devices having a processor, and in example embodiments, memory. Machine-readable storage medium, comprising executable instructions that, when executed by a processor, can also facilitate performance of the methods and operations described in FIGS. 6-8. In each of these operations, steps or aspects described in one operation can be substituted or combined with steps and aspects with respect to the other operations, as well as features described, unless context warrants that such combinations or substitutions are not possible. Further, if a feature, step, or aspect is not described with respect to example operations, this does not mean that said feature, step, or aspect is incompatible or impossible with respect to those operations. As such, the example operations of the present application described above (e.g., with respect to FIGS. 1-5) and below are not necessarily limited to the steps, features, or aspects that are described with respect to those example operations.

Figure 6:
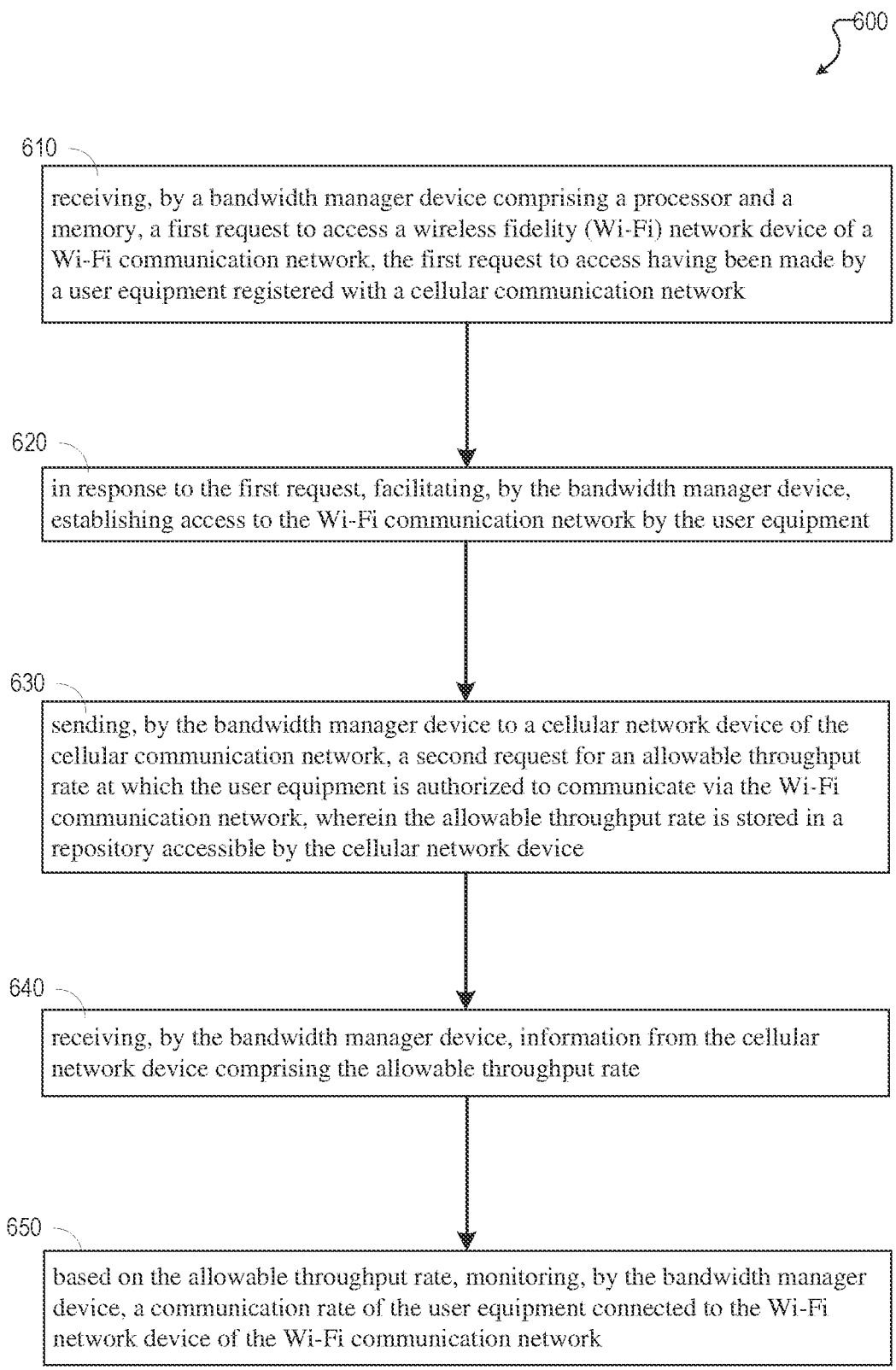
FIG. 6 illustrates an example of operations that can be performed by a bandwidth manager device (e.g., bandwidth manager device) to limit the data rate at which a UE communicates via a managed Wi-Fi service network, in accordance with various aspects and example embodiments of the present application.

FIG. 6 illustrates a flow diagram of example operations 600 that can be performed, for example, by a bandwidth manager device (e.g., Wi-Fi backbone aggregator 220, Wi-Fi access point 230, bandwidth manager 410) comprising a processor and a memory (e.g., a machine-readable storage medium) that stores executable instructions (e.g., software)

that, when executed by the processor, facilitate performance of the example operations described in FIG. 6.

The example operations 600 can comprise, at block 610, receiving, by the bandwidth manager device, a first request to access a wireless fidelity (Wi-Fi) network device (e.g., Wi-Fi backbone aggregator 220, Wi-Fi access point 230, bandwidth manager 410) of a Wi-Fi communication network (managed Wi-Fi service network 200), the first request to access having been made by a user equipment (e.g., UE 102) registered with a cellular communication network (e.g., cellular network 106).

The example operations 600 can further comprise, at block 620, in response to the first request, facilitating, by the bandwidth manager device, establishing access to the Wi-Fi communication network by the user equipment.

At block 630, the example operations 600 can further comprise sending, by the bandwidth manager device to a cellular network device (e.g., mobility carrier authentication server 420) of the cellular communication network, a second request for an allowable throughput rate (e.g., maximum allowable throughput, maximum allowable data rate, etc.) at which the user equipment is authorized to communicate via the Wi-Fi communication network, wherein the allowable throughput rate is stored in a repository (e.g., data repository 430) accessible by the cellular network device.

The example operations 600, at block 640, can further comprise receiving, by the bandwidth manager device, information from the cellular network device comprising the allowable throughput rate.

At block 650, the example operations 600 can further comprise, based on the allowable throughput rate, monitoring, by the bandwidth manager device, a communication rate of the user equipment connected to the Wi-Fi network device of the Wi-Fi communication network.

The example operations 600 can further comprise, in response to a determination that the communication rate of the user equipment connected to the Wi-Fi network device of the Wi-Fi communication network exceeds the allowable throughput rate over a measured time interval, facilitating reducing, by the bandwidth manager device, the communication rate of the user equipment connected to the Wi-Fi network device of the Wi-Fi communication network to the allowable throughput rate. The allowable throughput rate for the user equipment can be based on a first bandwidth cost of using, by the user equipment, the cellular communication network, and a second bandwidth cost of using, by the user equipment, the Wi-Fi communication network. The allowable throughput rate can be based on a time of day. The allowable throughput rate can be based on a geographic area in which the user equipment is located. The allowable throughput rate can be based on a subscriber agreement associated with a subscriber account related to the user equipment.

The example operations 600 can further comprise, sending, by the bandwidth manager device, a third request to the cellular network device to obtain an updated allowable throughput rate as an update to the allowable throughput rate.

Figure 7:
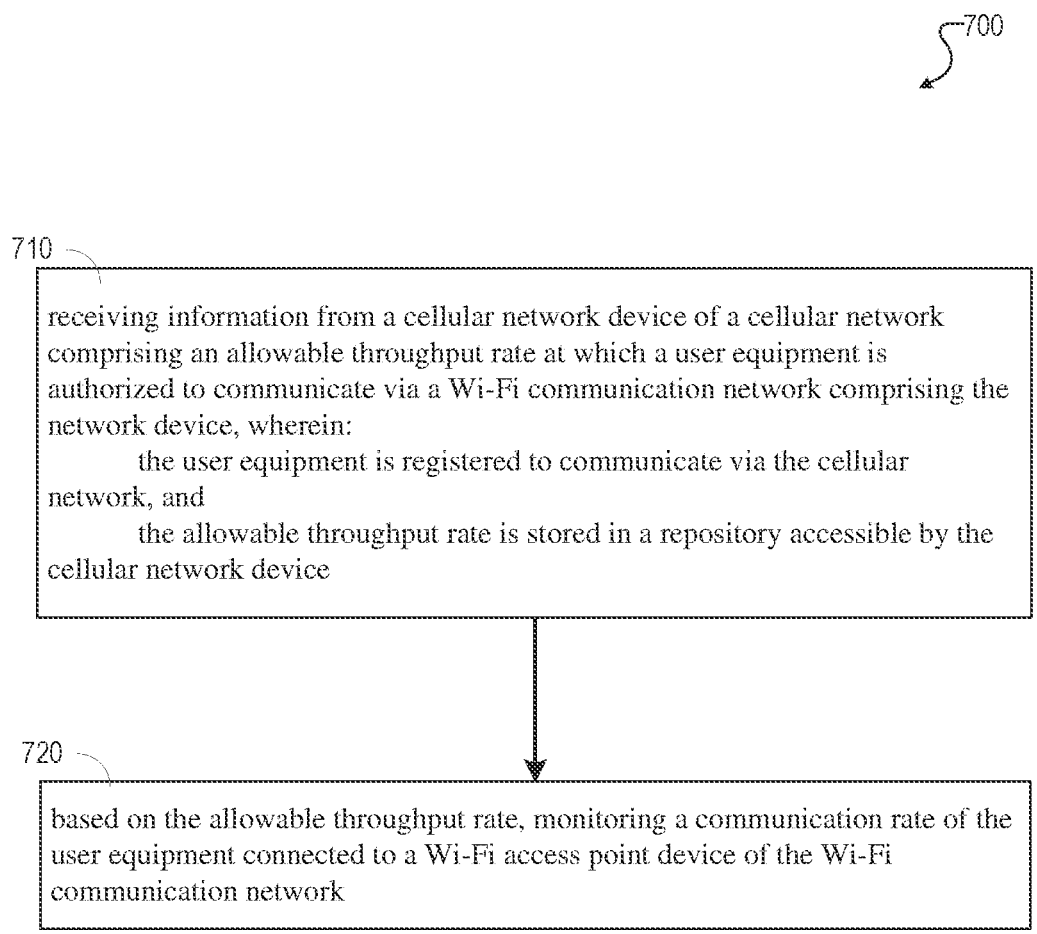
FIG. 7 illustrates another example of operations that can be performed by a bandwidth manager to limit the data rate at which a UE communicates via a managed Wi-Fi service network, in accordance with various aspects and example embodiments of the present application.

FIG. 7 illustrates a flow diagram of example operations 700 that can be performed, for example, by a network device (e.g., Wi-Fi backbone aggregator 220, Wi-Fi access point 230, bandwidth manager 410) comprising a processor and a memory (e.g., a machine-readable storage medium) that stores executable instructions (e.g., software) that, when executed by the processor, facilitate performance of the example operations described in FIG. 7.

The example operations 700 can comprise, at block 710, receiving information from a cellular network device (e.g., mobility carrier authentication server 420) of a cellular network (e.g., cellular network 106) comprising an allowable throughput rate at which a user equipment (e.g., UE 102) is authorized to communicate via a Wi-Fi communication network (e.g., managed Wi-Fi service network 200) comprising the network device, wherein the user equipment is registered to communicate via the cellular network, and the allowable throughput rate (e.g., maximum allowable throughput, maximum allowable data rate) is stored in a repository (e.g., data repository 430) accessible by the cellular network device. The allowable throughput rate for the user equipment can based on a first bandwidth cost of using, by the user equipment, the cellular network, and a second bandwidth cost of using, by the user equipment, the Wi-Fi communication network. The allowable throughput rate can be based on a time of day. The allowable throughput rate is based on a geographic area in which the user equipment is located. The allowable throughput rate is based on a subscriber agreement associated with a subscriber account related to the user equipment.

The example operations 700 can further comprise, at block 720, based on the allowable throughput rate, monitoring a communication rate of the user equipment connected to a Wi-Fi access point device (e.g., Wi-Fi backbone aggregator 220, Wi-Fi access point 230, bandwidth manager 410) of the Wi-Fi communication network.

At block 730, the example operations 700 can further comprise, in response to a determination that the communication rate of the user equipment connected to the Wi-Fi access point device of the Wi-Fi communication network exceeds the allowable throughput rate over a measured time interval, facilitating reducing the communication rate of the user equipment connected to the Wi-Fi access point device of the Wi-Fi communication network to the allowable throughput rate.

Figure 8:
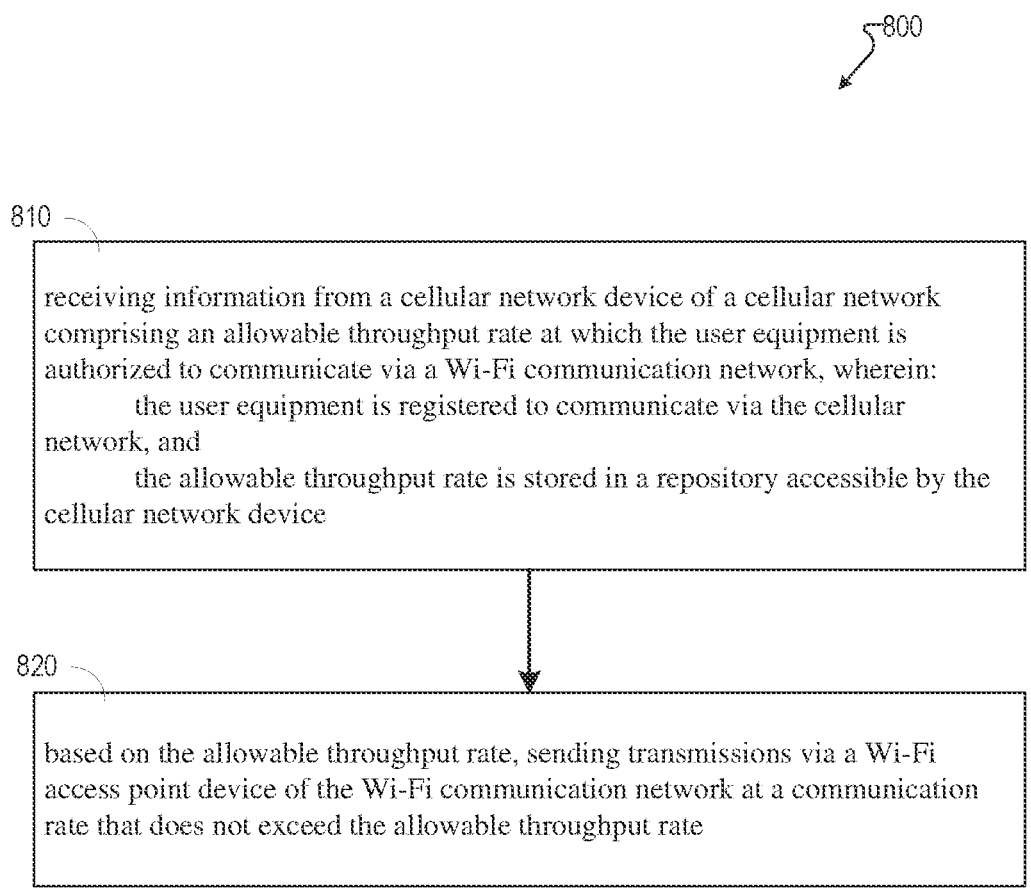
FIG. 8 illustrates an example of operations that can be performed by a UE to limit the data rate at which the UE communicates via a managed Wi-Fi service network, in accordance with various aspects and example embodiments of the present application.

FIG. 8 illustrates a flow diagram of example operations 800 that can be performed, for example, by a user equipment (e.g., UE 102) comprising a processor and a memory (e.g., a machine-readable storage medium) that stores executable instructions (e.g., software) that, when executed by the processor, facilitate performance of the example operations described in FIG. 8.

The example operations 800 can comprise, at block 810, receiving information from a cellular network device (e.g., mobility carrier authentication server 420, mobile network server 510) of a cellular network (e.g., cellular network 106) comprising an allowable throughput rate (e.g., maximum allowable throughput, maximum allowable data rate) at which the user equipment is authorized to communicate via a Wi-Fi communication network (e.g., managed Wi-Fi service network 200, wherein the user equipment is registered to communicate via the cellular network, and the allowable throughput rate is stored in a repository (e.g., data repository 430) accessible by the cellular network device. The allowable throughput rate for the user equipment can be based on a first bandwidth cost of using, by the user equipment, the cellular network, and a second bandwidth cost of using, by the user equipment, the Wi-Fi communication network. The allowable throughput rate can be based on a time of day. The allowable throughput rate can be based on a geographic area in which the user equipment is located. The allowable throughput rate can be based on a subscriber agreement associated with a subscriber account related to the user equipment. The allowable throughput rate can be one of a plurality of allowable throughput rates received by the user equipment, wherein each one of the allowable throughput rates is associated with a separate Wi-Fi communication network (e.g., another managed Wi-Fi service network provided by another Wi-Fi service network provider) that is distinct from the Wi-Fi communication network.

The example operations 800 can further comprise, at block 820, based on the allowable throughput rate, sending transmissions via a Wi-Fi access point device (e.g., bandwidth manager 410, Wi-Fi access point 230, Wi-Fi backbone aggregator 220) of the Wi-Fi communication network at a communication rate that does not exceed the allowable throughput rate.

Figure 9:
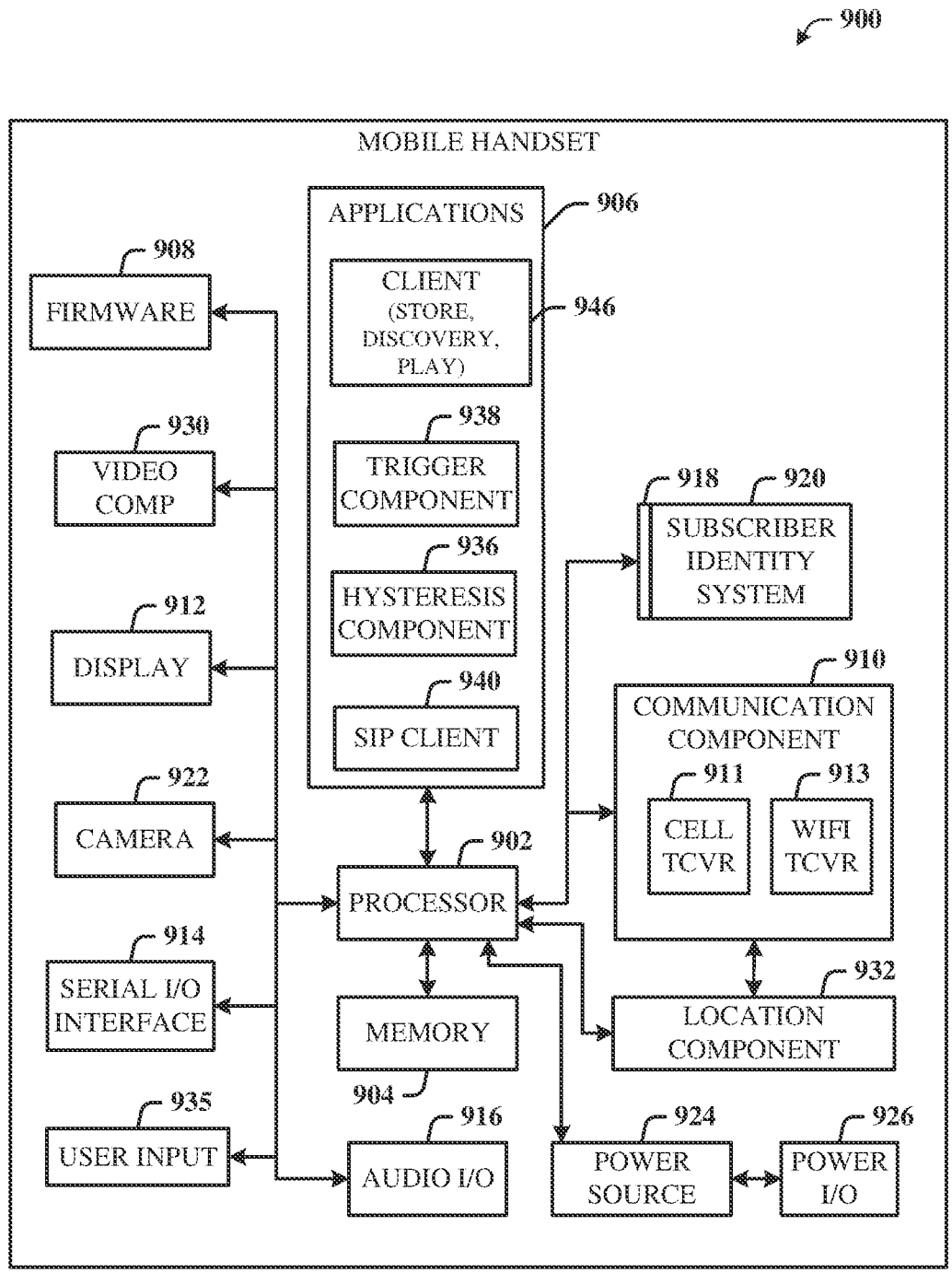
FIG. 9 illustrates an example block diagram of an example mobile handset (which can be a UE), in accordance with various aspects and example embodiments of the present application.

Referring now to FIG. 9, illustrated is a schematic block diagram of a user equipment (e.g., UE 102) that can be a mobile handset 900 capable of connecting to a network in accordance with some embodiments described herein. Although a mobile handset 900 is illustrated herein, it will be understood that the mobile device can be other devices as well, and that the mobile handset 900 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the mobile handset 900. A communication component 910 interfaces to the processor 902 to facilitate wired/wireless communication with external systems, e.g., cellular networks, VoIP networks, and so on. Here, the communications component 910 can also include a suitable cellular transceiver 911 (e.g., a global GSM transceiver) and/or an unlicensed transceiver 913 (e.g., Wi-Fi) for corresponding signal communications. The mobile handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The mobile handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the mobile handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The mobile handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the mobile handset 900, and updated by downloading data and software.

The mobile handset 900 can process IP data traffic through the communication component 910 to accommodate IP traffic from an IP network such as, for example, the Internet, a corporate intranet, a home network, a person area network, etc., through an ISP or broadband cable provider.

Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The mobile handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The mobile handset 900, as indicated above related to the communications component 910, includes an indoor network radio transceiver 913 (e.g., Wi-Fi transceiver). This function supports the indoor radio link, such as IEEE 802.11, for the mobile handset 900. The mobile handset 900 can accommodate at least satellite radio services through a handset that can combine wireless voice and digital radio chipsets into a single handheld device.

Figure 10:
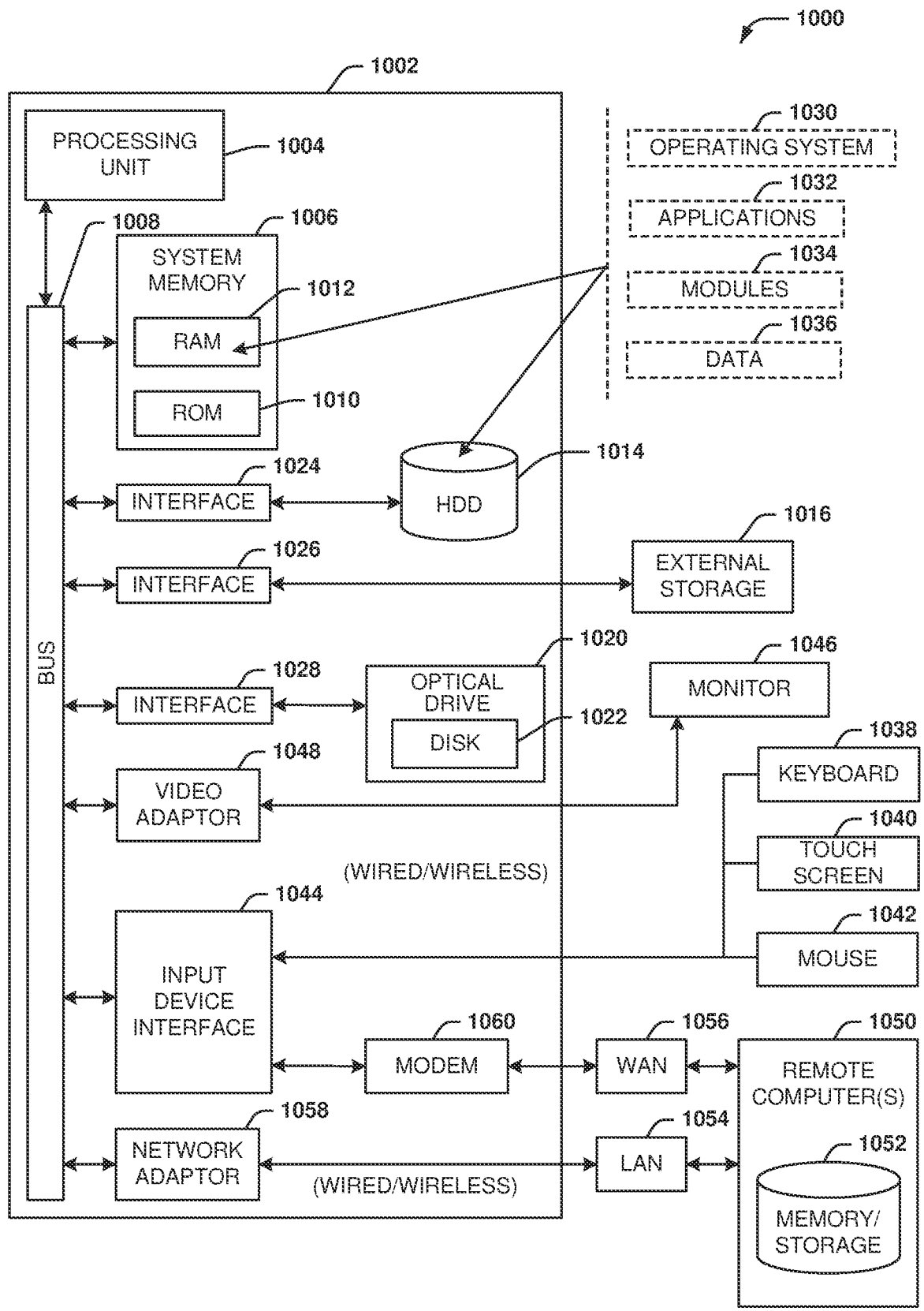
FIG. 10 illustrates an example block diagram of a computer (some of the components of which can be within a Wi-Fi access point device, a Wi-Fi backbone aggregator, a bandwidth manager device, mobility carrier authentication server, etc.) that can be operable to execute processes, operations, and methods, in accordance with various aspects and example embodiments of the present application.

In order to provide additional context for various embodiments described herein, FIG. 10 and the following discussion are intended to provide a brief, general description of a suitable computing environment 1000 in which the various embodiments described herein can be implemented. For example, one or more of the network devices (e.g., Wi-Fi access point 230, Wi-Fi backbone aggregator 220, bandwidth manager 410, mobility carrier authentication server 420, mobile network server 510) can have similar components to that of the computer described in FIG. 10.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

The term "facilitate" as used herein is in the context of a system, device or component "facilitating" one or more actions, methods, or example operations, in respect of the nature of complex computing environments in which multiple components and/or multiple devices can be involved in some computing operations. Non-limiting examples of actions that may or may not involve multiple components and/or multiple devices comprise the methods described herein, including but not limited to transmitting or receiving data, establishing a connection between devices, determining intermediate results toward obtaining a result, etc. In this regard, a computing device or component can facilitate an operation by playing any part in accomplishing the operation (e.g., directing, controlling, enabling, etc.). When operations of a component are described herein, it is thus to be understood that where the operations are described as facilitated by the component, the operations can be optionally completed with the cooperation of one or more other computing devices or components, such as, but not limited to, processors, application specific integrated circuits (ASICs), sensors, antennae, audio and/or visual output devices, other devices, etc.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the present application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the present application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A method, comprising:
   determining, by a bandwidth manager device comprising a processor, that a throughput rate of a user equipment connected to a Wi-Fi network device of a Wi-Fi communication network has exceeded an allowable throughput rate;
   in response to the determining that the throughput rate has exceeded the allowable throughput rate, facilitating, by the bandwidth manager device, injecting data packet delays into a packet scheduler of the user equipment;
   receiving, by the bandwidth manager device, an updated allowable throughput rate; and
   adjusting, by the bandwidth manager device, injection of the data packet delays according to the updated allowable throughput rate.

2. The method of claim 1, further comprising:
   facilitating, by the bandwidth manager device, receiving the allowable throughput rate from cellular network equipment associated with a cellular carrier service to which the user equipment is subscribed.

3. The method of claim 1, further comprising:
   determining, by the bandwidth manager device, the allowable throughput rate for the user equipment based on a cost of using, by the user equipment, a cellular communication network.

4. The method of claim 1, further comprising:
   determining, by the bandwidth manager device, the allowable throughput rate for the user equipment based on a cost of using, by the user equipment, the Wi-Fi communication network.

5. The method of claim 1, further comprising:
   determining, by the bandwidth manager device, the allowable throughput rate for the user equipment based on a geographic area in which the user equipment is located.

6. The method of claim 1, further comprising:
   determining, by the bandwidth manager device, the allowable throughput rate for the user equipment based on a subscriber agreement associated with a subscriber account related to the user equipment.

7. The method of claim 1, further comprising:
   determining, by the bandwidth manager device, the allowable throughput rate for the user equipment based on a time of day of the user equipment connecting to the Wi-Fi network device.

8. A network device, comprising:
a processor; and
a memory that stores executable instructions that, when executed by the processor, facilitate performance of operations, comprising:
determining that a communication rate of a user equipment connected to a Wi-Fi network device of a Wi-Fi communication network has exceeded a defined communication rate limit;
in response to the determining that the communication rate has exceeded the defined communication rate limit, injecting data packet delays into a packet scheduler of the user equipment;
receiving an updated defined communication rate limit; and
adjusting injection of the data packet delays according to the updated defined communication rate limit.

9. The network device of claim 8, wherein the operations further comprise:
obtaining the defined communication rate limit from a cellular carrier service for which the user equipment is an authorized subscriber.

10. The network device of claim 8, wherein the operations further comprise:
determining the defined communication rate limit for the user equipment based on cellular usage cost data representative of a cost of using, by the user equipment, a cellular communication network.

11. The network device of claim 8, wherein the operations further comprise:
determining the defined communication rate limit for the user equipment based on Wi-Fi usage cost data representative of a cost of using, by the user equipment, the Wi-Fi communication network.

12. The network device of claim 8, wherein the operations further comprise:
determining the defined communication rate limit for the user equipment based on geographical data representative of a geographic area in which the user equipment is located.

13. The network device of claim 8, wherein the operations further comprise:
determining the defined communication rate limit for the user equipment based on agreement data representative of a subscriber agreement associated with a subscriber account related to the user equipment.

14. The network device of claim 8, wherein the operations further comprise:
determining the defined communication rate limit for the user equipment based on temporal data representative of a time of day of the user equipment connecting to the Wi-Fi network device.

15. A non-transitory machine-readable medium, comprising executable instructions that, when executed by a processor of network equipment, facilitate performance of operations, comprising:
determining that a transmission rate of a user equipment connected to a Wi-Fi network device of a Wi-Fi communication network is at least a defined transmission rate limit;
in response to the determining that the transmission rate is at least the defined transmission rate limit, injecting data packet delays into a packet scheduler of the user equipment;
receiving an updated defined transmission rate limit; and
adjusting injection of the data packet delays according to the updated defined transmission rate limit.

16. The non-transitory machine-readable medium of claim 15, wherein the operations further comprise:
obtaining the defined transmission rate limit from a cellular carrier service to which the user equipment is subscribed.

17. The non-transitory machine-readable medium of claim 15, wherein the operations further comprise:
determining the defined transmission rate limit for the user equipment based on a cost of using, by the user equipment, a cellular communication network.

18. The non-transitory machine-readable medium of claim 15, wherein the operations further comprise:
determining the defined transmission rate limit for the user equipment based on a cost of using, by the user equipment, the Wi-Fi communication network.

19. The non-transitory machine-readable medium of claim 15, wherein the operations further comprise:
determining the defined transmission rate limit for the user equipment based on a geographic area in which the user equipment is located.

20. The non-transitory machine-readable medium of claim 15, wherein the operations further comprise:
determining the defined transmission rate limit for the user equipment based on a service level agreement associated with a subscriber account related to the user equipment.

* * * * *